US012670208B2

(12) United States Patent
Jeong et al.

(10) Patent No.:  US 12,670,208 B2
(45) Date of Patent:       Jun. 30, 2026

(54) LIFELOG DEVICE UTILIZING AUDIO RECOGNITION, AND METHOD THEREFOR

(71) Applicant: Cochl Inc, Dover, DE (US)

(72) Inventors: Ilyoung Jeong, Seoul (KR); Hyungui Lim, Seoul (KR); Yoonchang Han, Seoul (KR); Subin Lee, Seoul (KR); Jeongsoo Park, Yongin-si (KR); Donmoon Lee, Suwon-si (KR)

(73) Assignee: Cochl Inc., Dover, DE (US)

( * ) Notice: Subject to any disclaimer, the term of this patent is extended or adjusted under 35 U.S.C. 154(b) by 205 days.

(21) Appl. No.: 18/009,361

(22) PCT Filed: Jun. 18, 2021

(86) PCT No.: PCT/KR2021/007657
§ 371 (c)(1),
(2) Date: Dec. 9, 2022

(87) PCT Pub. No.: WO2021/256889
PCT Pub. Date: Dec. 23, 2021

(65) Prior Publication Data
US 2023/0222158 A1       Jul. 13, 2023

(30) Foreign Application Priority Data
Jun. 19, 2020     (KR) ........................ 10-2020-0075196

(51) Int. Cl.
*G06F 16/638*          (2019.01)
*G06F 16/64*           (2019.01)
(Continued)

(52) U.S. Cl.
CPC ............ *G06F 16/64* (2019.01); *G06F 16/638* (2019.01); *G06F 16/65* (2019.01); *G06F 16/686* (2019.01)

(58) Field of Classification Search
CPC ........ G06F 16/64; G06F 16/638; G06F 16/65; G06F 16/686
See application file for complete search history.

(56) References Cited

U.S. PATENT DOCUMENTS

2010/0142715 A1    6/2010  Goldstein et al.
2010/0274774 A1*  10/2010  Son ...................... G06F 16/907
                                                                 707/706
(Continued)

FOREIGN PATENT DOCUMENTS

JP            2013162277 A       8/2013
JP            2015-152948 A      8/2015
(Continued)

OTHER PUBLICATIONS

Mohit Shah et al. "Lifelogging: Archival and retrieval of continuously recorded audio using wearable devices" SenSIP Center, School of ECEE, Arisona State University, ESPA 2012, pp. 99-102.
(Continued)

*Primary Examiner* — Joseph Saunders, Jr.
(74) *Attorney, Agent, or Firm* — NKL Law; Jae Youn Kim

(57)                ABSTRACT
The present invention relates to a lifelog device utilizing audio recognition and a method therefor, and to a device capable of recording and classifying audio lifelogs by means of an artificial intelligence algorithm. To this end, the lifelog device of the present invention comprises: an input unit for inputting lifelog data including an audio signal; and analysis unit for analyzing the inputted data; a determination unit for classifying the class of the data on the basis of the analyzed analysis value; and a recording unit for recording the inputted data and the classified class of the data.

3 Claims, 7 Drawing Sheets

(51) Int. Cl.
  *G06F 16/65*       (2019.01)
  *G06F 16/68*       (2019.01)

(56)               References Cited

U.S. PATENT DOCUMENTS

| | | | |
|---|---|---|---|
| 2015/0043737 A1* | 2/2015 | Abe | G10L 25/48 |
| | | | 381/56 |
| 2016/0026873 A1* | 1/2016 | Wexler | G06V 20/64 |
| | | | 348/158 |
| 2016/0150333 A1* | 5/2016 | Goldstein | H04R 29/00 |
| | | | 381/56 |
| 2016/0364963 A1* | 12/2016 | Matsuoka | G06V 10/764 |
| 2017/0154638 A1* | 6/2017 | Hwang | G01S 3/808 |
| 2018/0078188 A1* | 3/2018 | Kaneko | A61B 5/0205 |
| 2019/0115045 A1* | 4/2019 | Jarvis | G10L 17/00 |
| 2019/0259378 A1* | 8/2019 | Khadloya | G06N 20/10 |
| 2019/0318033 A1* | 10/2019 | Ganadas | G06F 16/9535 |
| 2020/0125952 A1* | 4/2020 | Mosayyebpour | G10L 25/30 |

FOREIGN PATENT DOCUMENTS

| | | |
|---|---|---|
| JP | 2018013857 A | 1/2018 |
| JP | 2018093503 A | 6/2018 |
| JP | 2019091486 A | 6/2019 |
| KR | 10-2011-0125431 A | 11/2011 |
| KR | 10-2015-0046818 A | 5/2015 |
| KR | 10-2017-0034260 A | 3/2017 |
| KR | 10-2260466 B1 | 6/2021 |

OTHER PUBLICATIONS

Yali Zheng et al. "Speech/Music Indexing for Audio Life-Logs from Portable Device Record" College of Information and Engineering, Guilin University of Technology, China and Graduate School of Science and Technology, Kumamoto University, Japan. pp. 173-178, 2013.

Taro Tezuka et al. "Audio Lifelog Search System Using a Topic Model for Reducing Recognition Errors", College of Information Science and Engineering, Ritsumeikan University, pp. 73-82, 2011.

Masayuki Ono et al., Structuring of life logs by various sensors using a neural network Electronic Information and Communication Society Technical Research Report, Electronic Information and Communication Society, Japan, Jun. 1, 2009, vol. 109No. 75, pp. 79-84.

* cited by examiner

LIFELOG DEVICE UTILIZING AUDIO RECOGNITION, AND METHOD THEREFOR

TECHNICAL FIELD

The present invention relates to a lifelog device and method employing audio recognition, and more specifically, to a device for recording and classifying audio lifelogs using an artificial intelligence algorithm.

BACKGROUND ART

With the changes of the times, lifelog services for recording acquirable information of users' daily lives and searching the information as necessary are being provided. According to conventional lifelog services, information is acquired from a user's daily life using a camera, a Global Positioning System (GPS) device, pulse measurement, distance measurement, etc. and recorded, and then use of the recorded information is allowed. Conventionally, a user's travel distance, altitude, pulse rate, etc. are measured mainly through a band-type wearable device, and thus health-related lifelogs based on bio-signals are frequently used. Like this, conventional lifelog services involve equipping a user's body with separate sensors to obtain various pieces of information of the user. However, equipping a user's body with many sensors causes inconvenience in the user's daily life, and the user may have an aversion thereto. Accordingly, this is difficult to commercially put to practical use. Also, according to the conventional lifelog services, the data amount of each piece of collected information is large and thus occupies a large capacity of memory. Also, it is not possible to recognize the user's comprehensive life patterns such as places, situations, etc.

To solve these problems of the conventional technology, the present invention proposes a lifelog device and method employing audio recognition which are applicable to earphones that have been used by a user.

Prior Art Document (Patent Document) Korean Patent 10-1777609 (Sep. 6, 2017).

DISCLOSURE

Technical Problem

The present invention is directed to providing a lifelog device employing only audio recognition.

The present invention is also directed to providing a device for collecting pieces of information in addition to audio recognition information and recording a lifelog only through ear equipment worn by a user.

The present invention is also directed to allowing recorded lifelogs to be searched by each tag and collected.

Technical Solution

One aspect of the present invention provides a lifelog device including an input unit to which lifelog data including an audio signal is input, an analysis unit configured to extract an analysis value from the input data, a determination unit configured to classify a class of the data on the basis of the extracted analysis value, and a recording unit configured to record the input data and the classified class of the data.

Advantageous Effects

According to the present invention, it is possible to obtain a lifelog using an audio signal through one pair of a user's ear equipment.

Also, it is possible to collect and record visiting places, situations, conversations, various pieces of audio information, etc. of a user through audio signals.

Further, recorded information is automatically classified by an artificial intelligence algorithm so that desired information can be extracted by a search.

BEST MODE OF THE INVENTION

Figure 1:
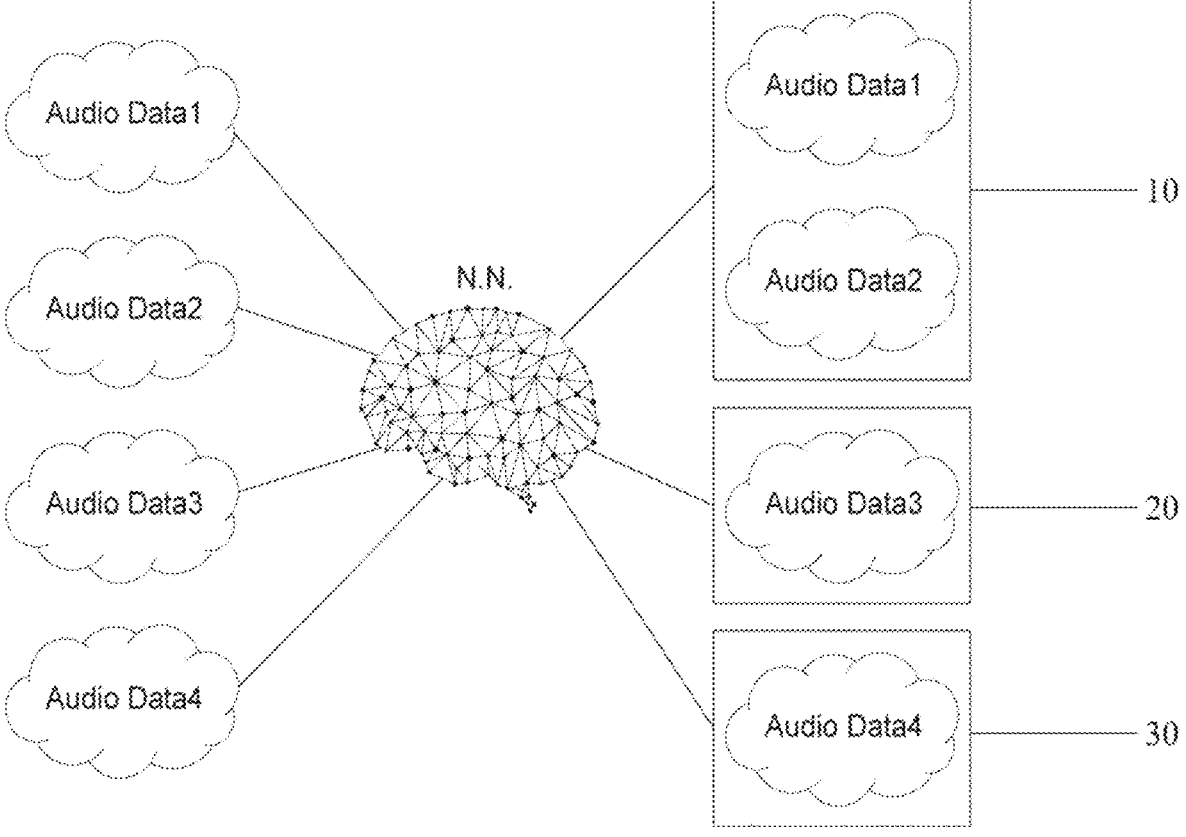
FIG. 1 is a schematic diagram of an overall system of a lifelog device according to an embodiment of the present invention.

A lifelog device comprising; an input unit to which lifelog data including an audio signal is input; an analysis unit configured to extract an analysis value from the input data; a determination unit configured to classify a class of the data on the basis of the extracted analysis value; and a recording unit configured to record the input data and the classified class of the data.

Modes of the Invention

Hereinafter, embodiments of the present invention will be described in detail with reference to the accompanying drawings so that those of ordinary skill in the art can easily implement the present invention. However, the present invention can be implemented in various different forms and is not limited to the drawings and embodiments disclosed below. To clearly describe the present invention, in the drawings, parts unrelated to the present invention will be omitted, and like reference numerals refer to like components.

Objectives and effects of the present invention can be naturally understood or will become apparent from the following description. A detailed description of the present invention will be omitted when determined to unnecessarily obscure the gist of the present invention. Therefore, objectives and effects of the present invention are not limited to the following description only.

The present invention will be described in detail below with reference to the drawings.

FIG. 1 is a schematic diagram of an overall system of a lifelog device according to an embodiment of the present invention.

An embodiment of the present invention will be briefly described with reference to FIG. 1. The present invention relates to a lifelog device that receives, records, and stores lifelog data of a user's daily life, and specifically, the lifelog device may determine and record various pieces of information by analyzing an audio signal. More specifically, as shown in FIG. 1, one or more audio signals (audio data) may be input to the lifelog device according to the embodiment of the present invention, and the one or more input audio signals may be classified into classes including CLASS 1 10, CLASS 2 20, CLASS 3 30 on the basis of analysis values obtained by an artificial intelligence algorithm analyzing the data. Here, the classes may be classified in accordance with settings classified in advance by the user and may be upgraded by training the artificial intelligence algorithm. The audio signals classified into classes may be extracted later by the user's search and request so that data wanted by the user can be readily provided.

Figure 2:
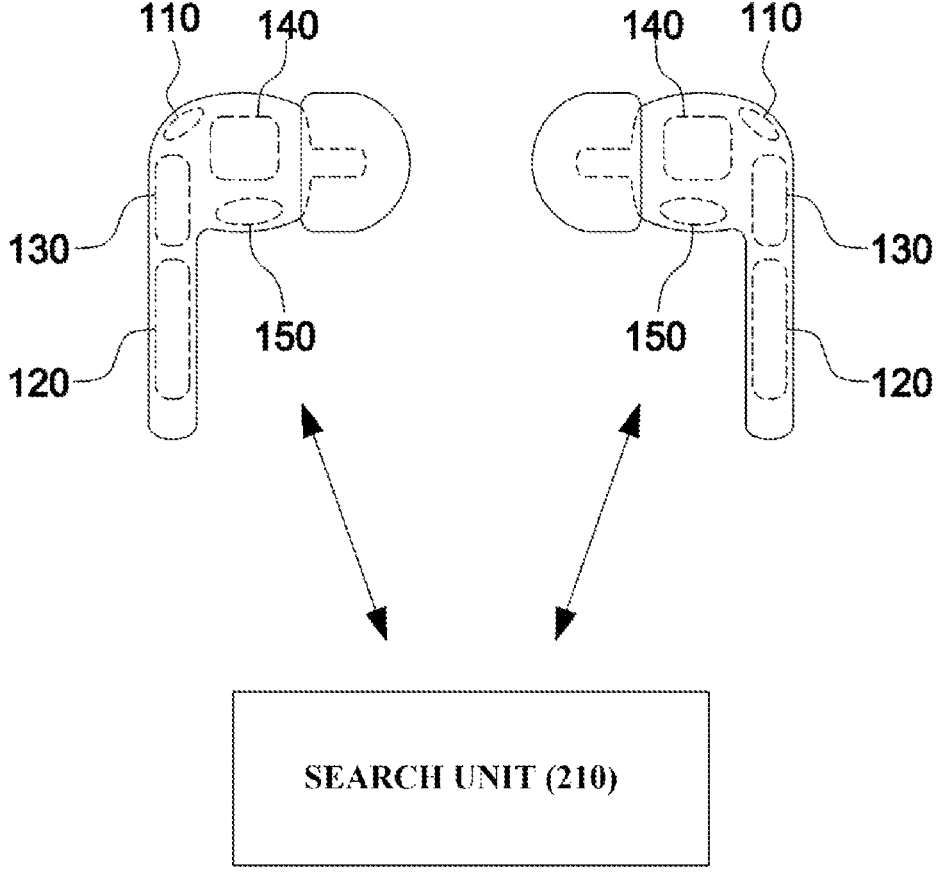
FIG. 2 is a diagram of a lifelog device according to an embodiment of the present invention.

The lifelog device will be described in further detail below in accordance with each element with reference to FIGS. 2 and 3. FIG. 2 is a diagram of a lifelog device according to an embodiment of the present invention, and FIG. 3 is a block diagram of a lifelog device according to an embodiment of the present invention.

Figure 3:
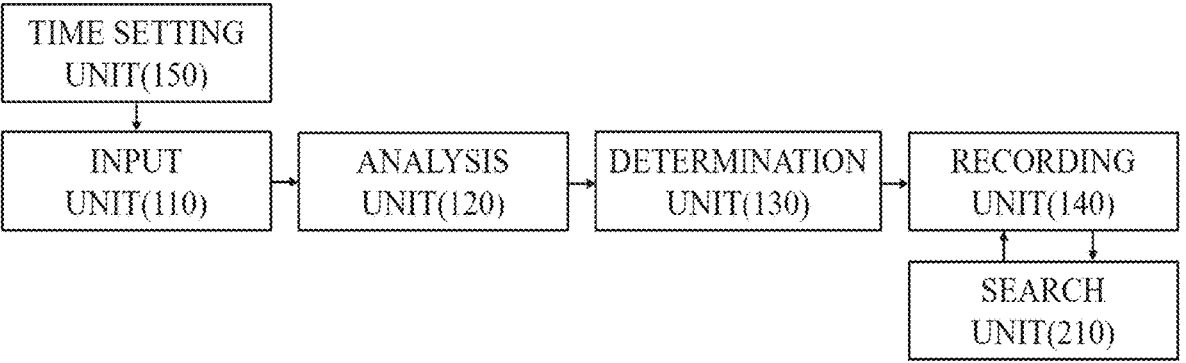
FIG. 3 is a block diagram of a lifelog device according to an embodiment of the present invention.

Referring to FIGS. 2 and 3, according to the embodiment, the lifelog device of the present invention may include an input unit 110, an analysis unit 120, a determination unit 130, a recording unit 140, a time setting unit 150, and a search unit 210. Before the detailed description of each element, the lifelog device may be provided using an existing earphone, an existing headset, one of various types of existing wearable devices, an existing wireless terminal, etc., and for convenience of description, the embodiment of the present invention will be described on the basis of a wireless earphone which is the most preferable embodiment.

The input unit 110 is an element to which lifelog data including an audio signal is input. Specifically, an externally generated audio signal may be input through a sensor such as a microphone or the like. In addition to the audio signal, one or more of a time at which the data is input, the user's location at the time, the user's pulse rate at the time, the user's body temperature at the time may be input through various sensors and the like. However, the input unit 110 of the lifelog device of the present invention necessarily receives an audio signal. To be specific, the input audio signal may include all of external noise, conversations of nearby people, various environmental sounds, etc.

The analysis unit 120 may extract an analysis value from the data input to the input unit 110. The analysis unit 120 is an element that analyzes the input data, and may transmit the analysis value extracted from the audio signal included in the input data to the determination unit 130. To be specific, the analysis value may be a value obtained by extracting at least one of a frequency and amplitude of the audio signal but may be provided as a specific value that is abstract and not intuitable and may be determined by the artificial intelligence algorithm. Specifically, a certain accurate value may be transmitted, but a value of the audio signal may be transmitted so that the artificial intelligence algorithm may extract class classification and determination values on the basis of results of learning. More specifically, when a plurality of audio signals are input, the audio signals may be separately analyzed, and an analysis value may be extracted from each of the audio signals and transmitted to the determination unit 130. Here, the analysis value may include not only analysis information of the audio signal but also other information of measured data. Specifically, when the user's bio-information is input to the input unit 110 together with the audio signal, analysis values of the bio-information, such as the user's pulse rate, body temperature, etc., may also be transmitted to the determination unit 130.

The determination unit 130 is an element that classifies data into a class on the basis of an extracted analysis value of each piece of data. Specifically, classes of data classified by the determination unit 130 may be classified for convenience of the user to include one or more of human voice, musical sounds, life noises, other environmental noises, etc. in accordance with the user's setting. More specifically, the determination unit 130 may classify a class of data in accordance with an analysis value using the previously installed artificial intelligence algorithm, and the artificial intelligence algorithm may be trained with a final determination value of a classified class through the user's feedback. To be specific, when the determination value of the determination unit 130 is not a classification in accordance with the user's setting, the user may arbitrarily correct the class of the data, and the artificial intelligence algorithm may be upgraded to provide a user-customized determination value by learning the correction result. The determination unit 130 may not only classify a class of data on the basis of an analysis value but may also determine information related to a place at which the data is input. Specifically, when the determination unit 130 recognizes the audio signal as a subway announcement on the basis of the analysis value of the audio signal and classifies the class, a determination value may classify the corresponding data as a subway announcement and also include place information that the user is in public transportation or a subway. In this way, the determination unit 130 may match the determination value of the data with information related to an input place of the data and transmit the determination value and the information matching each other to the recording unit 140.

The recording unit 140 is an element that records the determination value of the data determined by the determination unit 130, and may match and record the class of the data, the place information, etc. included in the determination value determined by the determination unit 130 with each other. Also, the recording unit 140 may match and record an input time of the data, the user's physical information at the time, etc. with each other. Specifically, the recording unit 140 may match and record the determination value of the data, which is input to the input unit 110 and analyzed and determined, and various pieces of information with each other and remove data that is determined to be a noise class for the efficiency of memory. More specifically, data including an audio signal determined to be the noise class and information matching the data may all be removed, and only meaningful data and information may be stored in the recording unit 140.

The time setting unit 150 is an element that sets a time at which data is input to the input unit 110. Data may be input to the lifelog device of the present invention only for a certain time period preset by the time setting unit 150. Specifically, a battery of the lifelog device according to an embodiment of the present invention can be saved by the time setting unit 150, and data inputs in meaningless situations can be minimized. Turning on or off the input unit 110 of the lifelog device may be controlled by not only the time setting unit 150 but also an artificial intelligence algorithm which is aware of a specific word or situation. Specifically, since battery consumption is reduced in a standby mode compared to when the input unit 110 operates, the standby mode is maintained. When the specific word is input or a specific location or the specific situation is recognized, the standby mode is stopped, and the input unit 110 may be turned on to operate. Specifically, when a signal in a specific audio frequency range is recognized or a word, such as "on," "wakeup," etc., is recognized, the standby mode may be stopped, and a lifelog may be started.

The search unit 210 is an element that searches data information recorded in the recording unit 140, and the recording unit 140 may extract and provide recorded data matching keyword information input by the search unit 210. Specifically, the search unit 210 may be provided in an external user terminal or the lifelog device of the present invention. More specifically, a keyword may be directly input through the external user terminal and searched for, or a keyword may be input from the user's voice through a microphone of the user terminal or lifelog device and searched for. Data stored in the recording unit 140 may be stored in combination with information, such as a class, a keyword, etc., and corresponding data may be extracted on the basis of keyword information input from the search unit 210 and provided to the user.

A first embodiment of extracting recorded lifelog data will be described in detail below with reference to FIGS. 4 to 7. FIGS. 4 to 7 are diagrams showing a screen of a lifelog device according to the first embodiment of the present invention.

Figure 4:
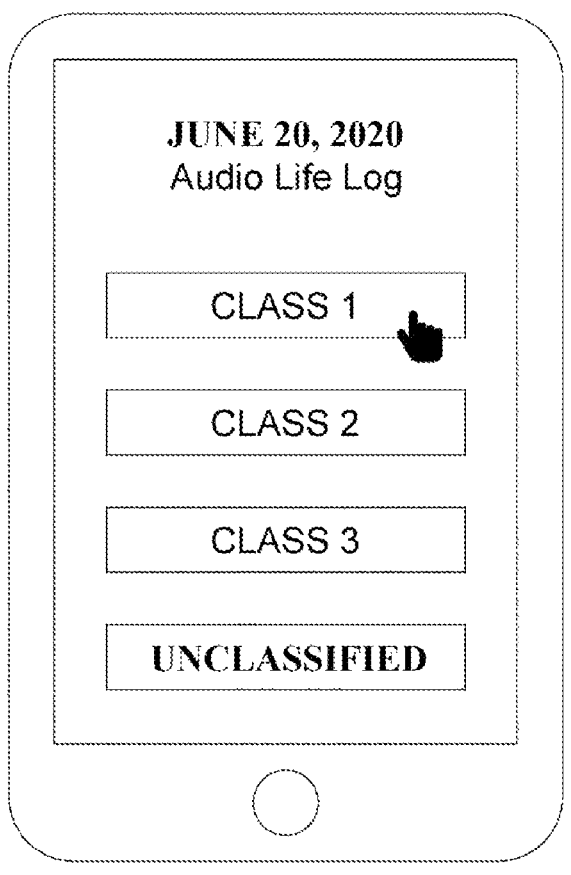
FIGS. 4 to 7 are diagrams showing a screen of a lifelog device according to a first embodiment of the present invention.
Figure 5:
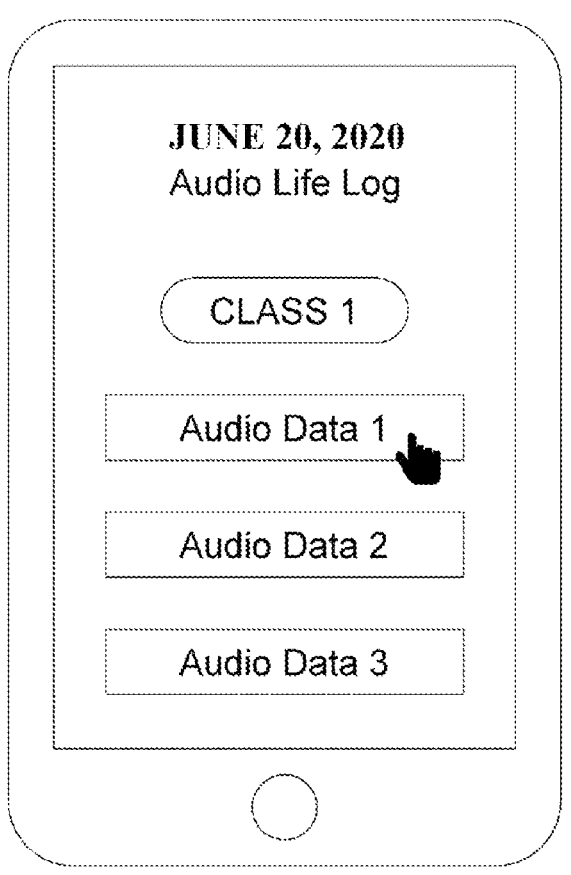
Figure 6:
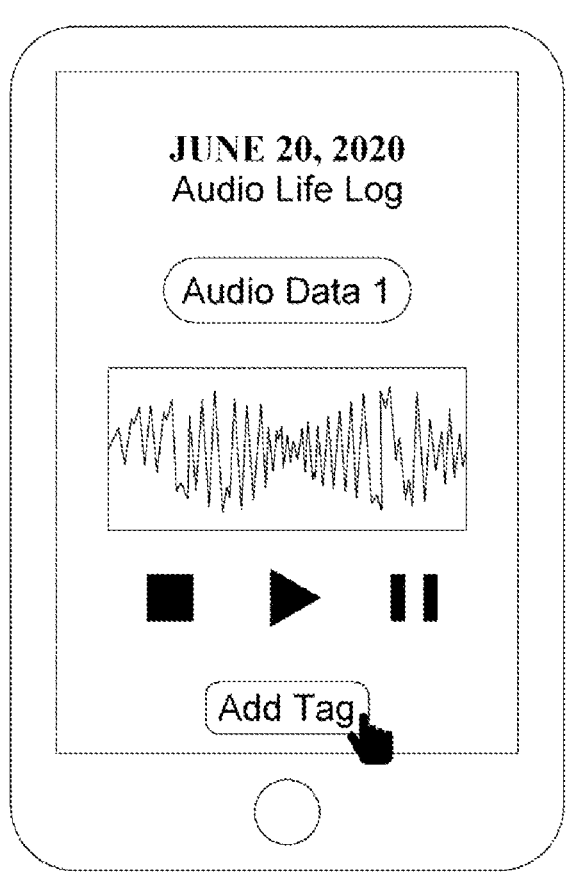
Figure 7:
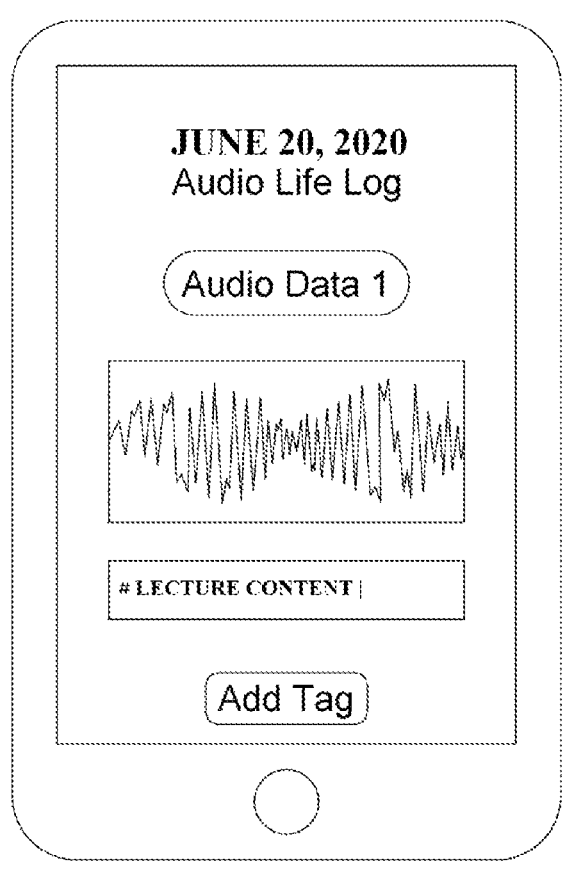

First, as described above, lifelog data input through the input unit 110 is classified into data-specific classes through the artificial intelligence algorithm, and the data and the classified classes of the data may be recorded in the recording unit 140 in combination with each other. Subsequently, a user may extract data of desired information through the search unit 210 on the basis of class or keyword information. According to the first embodiment, the search unit 210 may be provided through a separate user terminal, and more specifically, may be provided to the user through a screen of the user terminal. As shown in FIG. 4, the screen provided to the user may be provided on the basis of a class into which the input data is classified, and the user may select a class that he or she wants to search for. Accordingly, when the user clicks CLASS 1 10 or makes a search request through his or her voice to search for data classified into CLASS 1 10 as shown in FIG. 4, a list of data classified into CLASS 1 10 may be extracted as shown in FIG. 5. Subsequently, when the user selects any one piece of data from the extracted data list, an audio signal of the selected piece of data may be played and heard. Specifically, when the user selects Audio Data 1 from the list of data classified into CLASS 1 10 as shown in FIG. 5, the selected Audio Data 1 may be played as shown in FIG. 6. Also, according to another embodiment, other information matching Audio Data 1 may be output together. Specifically, information recorded in combination, such as a time, a place, and a situation in which Audio Data 1 is input, the user's bio-rhythm at the time, etc., may be extracted. Subsequently, according to the first embodiment, when the user wants to add tag information to Audio Data 1, the user may select an Add Tag button as shown at the bottom of FIG. 6. Then, a tag information input window is displayed as shown in FIG. 7, and the user may add tag information by directly inputting the tag information to the input window. When the tag information is added in this way, the input tag information is matched to the corresponding data, and it is possible to find the data by simply searching for the tag information.

A second embodiment which is another embodiment will be described in detail below.

According to the second embodiment, lifelog data input through the input unit 110 may be classified into data-specific classes through the artificial intelligence algorithm, and the data and the classified classes of the data may be recorded in the recording unit 140 in combination with each other. Here, the classes may be automatically classified by learning of the artificial intelligence algorithm, and classifications may be adjusted in accordance with the user's request. More specifically, classified classes may be classified at a first stage or sub classified into detailed classes, that is, subordinate categories of superordinate categories. For example, when a class of human conversation is a superordinate category, voice may be analyzed in detail to determine what kind of situation the user is in, how many people the user is talking to, and even who the user is talking to so that the voice may be classified into a subordinate category. Subsequently, the search unit 210 may provide at least one of the number of times and a time of class-specific data classified by the user's search. More specifically, when the user requests information classified into CLASS 1 10, information, such as how many times data is classified into CLASS 1 10, how long a total is, etc., may be checked. According to a detailed embodiment, the number of times a class is classified as a water sound may be provided to check how many times a day the user washes his or her hands, the number of times a class is classified as a sound of brushing teeth may be provided to check how many times a day the user brushes his or her teeth, and how long the user brushes his or her teeth may be provided and checked. Such information can help the user manage healthy life habits and patterns. Also, keyboard typing sounds may be tracked, and a class classified as a typing sound may be analyzed to approximately provide a typing time, the number of typing sessions, etc. Accordingly, it is possible to approximately check a degree of concentration on work, actual work hours, workload, etc. In addition, when a class is classified as conversations with others, the artificial intelligence model may learn speakers who frequently talk with the user to provide information about with whom the user talked and the like, and may detect accents and pitches during conversations between speakers to provide a summary of important parts of the conversation.

As described above, when the lifelog device employing audio recognition according to the present invention is used, it is possible to classify audio signals of a user's daily life by class, store the classified audio signals, and extract a desired audio signal through a keyword search. Also, it is possible to provide the number of times and a time of a class classified on the basis of an audio signal.

The above description of the present invention relates merely to an embodiment. Those of ordinary skill in the art can make various modifications and other equivalents from the embodiment. The scope of the present invention is not limited to the above-described embodiment and the accompanying drawings.

INDUSTRIAL APPLICABILITY

According to the present invention, it is possible to obtain a lifelog using an audio signal through one pair of a user's ear equipment.

Also, it is possible to collect and record visiting places, situations, conversations, various pieces of audio information, etc. of a user through audio signals.

Further, recorded information is automatically classified by an artificial intelligence algorithm so that desired information can be extracted by a search.

The invention claimed is:

1. A lifelog device comprising:

an ear equipment configured to be worn by a user, the equipment including:

an input unit to which lifelog data including an audio signal and biological information including at least one of a user's pulse rate or a user's body temperature is input through a sensor;

a time setting unit configured to set a time for which the lifelog data is input to the input unit;

an analysis unit configured to extract an analysis value from the input lifelog data;

a determination unit configured to classify a class of the lifelog data on the basis of the extracted analysis value;

a recording unit configured to record data including the input lifelog data and the classified class of the lifelog data; and a search unit configured to search for the recorded data, wherein the search unit extracts the recorded data which matches keyword information input by the search unit, wherein the search unit provides at least one of a number or a time of the recorded data corresponding to the classified class, wherein the lifelog data is input for a time preset by the time setting unit, wherein the analysis unit transmits the analysis value extracted from the audio signal and the biological information included in the input lifelog data to the determination unit, wherein the determination unit classifies the class of the lifelog data on the basis of a combination of the analysis value of the audio signal and an analysis value of the biological information using an artificial intelligence algorithm which is installed in advance, wherein the artificial intelligence algorithm is trained with a user's feedback on a determination value determined by the determination unit, wherein the determination unit matches the determination value for the lifelog data with information related to a place in which the lifelog data is input, and transmits the determination value and the information matching each other to the recording unit, and wherein the recording unit records the determination value for the lifelog data determined by the determination unit and removes data determined to be a noise class.

2. The lifelog device of claim 1, wherein the search unit is provided through a screen of a user terminal, when the user selects a classified class of the lifelog data, a list of the lifelog data classified into the class is extracted, and when any one piece of the lifelog data in the extracted list is selected, an audio signal of the selected piece of the lifelog data is played.

3. The lifelog device of claim 2, wherein, when the user additionally inputs arbitrary tag information to the selected piece of the lifelog data, the input tag information is matched to the selected piece of the lifelog data with the input tag information.

* * * * *